(12) United States Patent
Hale et al.

(10) Patent No.: US 6,279,163 B1
(45) Date of Patent: Aug. 28, 2001

(54) MUSICAL INSTRUMENT PRACTICE GLOVE

(76) Inventors: Christopher L. Hale; Melissa G. Hale, both of 23903 SW. 167 Ave., Homestead, FL (US) 33031

(*) Notice: Subject to any disclaimer, the term of this patent is extended or adjusted under 35 U.S.C. 154(b) by 0 days.

(21) Appl. No.: 09/760,898

(22) Filed: Jan. 16, 2001

(51) Int. Cl.[7] .................................................. A41D 19/00
(52) U.S. Cl. ............................... 2/160; 2/161.1; 482/105; 84/468
(58) Field of Search ......................... 2/159, 160, 161.1, 2/163; 482/105, 44, 48; 84/465, 468

(56) References Cited

U.S. PATENT DOCUMENTS

| | | | |
|---|---|---|---|
| 2,736,034 | * | 2/1956 | Fredenhagen . |
| 3,838,853 | * | 10/1974 | Fredenhagen . |
| 4,247,097 | * | 1/1981 | Schwartz . |
| 4,326,706 | * | 4/1982 | Guthrie et al. . |
| 4,330,120 | * | 5/1982 | Netti . |
| 5,169,371 | * | 12/1992 | Holmes . |
| 6,088,835 | * | 7/2000 | Perkins et al. . |
| 6,119,271 | * | 9/2000 | Byon . |

* cited by examiner

*Primary Examiner*—Rodney M. Lindsey
(74) *Attorney, Agent, or Firm*—John D. Gugliotta

(57) ABSTRACT

A pair of gloves with integral weights on the back of the hand and on the back of the fingers is provided to provide muscle strengthening for specific tasks, such as in practicing a musical instrument. Such use gives the user the perception of lighter hands resulting in quicker hand movement and increased dexterity.

7 Claims, 4 Drawing Sheets

MUSICAL INSTRUMENT PRACTICE GLOVE

RELATED APPLICATIONS

The present invention was first described in Disclosure Document Number 467,873 filed on Jan. 13, 2000. There are no previously filed, nor currently any co-pending applications, anywhere in the world.

BACKGROUND OF THE INVENTION

1. Field of the Invention

The present invention relates generally to gloves and apparatus for strengthening the hand and fingers and, more particularly, to a practice glove and practice method for training in the playing of musical instruments.

2. Description of the Related Art

In the related art, a common sight during a baseball game is that of the oncoming batter swinging a bat around with donut-shaped weights on it. This practice not only helps condition and loosen muscles before batting, it also gives the illusion of a lighter bat when the weights are removed. Thus when the batter does bat, hopefully he or she will be able to swing the bat quicker and more precisely due to its perceived weight decrease. This practice could be useful in any task that requires a quickness in speed.

One of these tasks is the playing of a musical instrument in which hand and finger quickness play an important part, such as the playing of a piano, a drum set, or any stringed instrument or horn. However the task of weight conditioning one's hand or finger area is extremely difficult do to the smallness of size.

A search of the prior art did not disclose any patents that read directly on the claims of the instant invention; however, the following references were considered related.

The following patents disclose an exerciser for the finger, hand, wrist, and forearm.

U.S. Pat. No. 5,768,710 issued in the name of Williams; and

U.S. Pat. No. 4,455,019 issued in the name of Harris.

The following patents describe a weighted exercising glove:

U.S. Pat. No. 5,468,200 issued in the name of Hoffman;

U.S. Pat. No. 4,923,418 issued in the name of Hoffman;

U.S. Pat. No. 4,911,433 issued in the name of Walker et al.;

U.S. Pat. No. 4,368,883 issued in the name of Tiktin; and

U.S. Pat. No. 4,253,660 issued in the name of Tiktin.

U.S. Pat. No. 5,004,227 issued in the name of Hoffman discloses an exercise apparatus for strapping weights to a user's hands.

The following patents describe an orthopedic exercising device:

U.S. Pat. No. 4,830,360 issued in the name of Carr, Jr.; and

U.S. Pat. No. 3,231,910 issued in the name of Tegland

Consequently, a need has been felt for providing an apparatus and method by which hands and fingers can be strengthened and toned by the strategic placement of weights.

SUMMARY OF THE INVENTION

It is therefore an object of the present invention to provide an improved apparatus for strengthening the hand and fingers.

It is a feature of the present invention to provide an improved practice glove and practice method for training in the playing of musical instruments.

Briefly described according to one embodiment of the present invention, a pair of gloves with integral weights on the back of the hand and on the back of the fingers is disclosed. Appearing like pair of conventional gloves, integral weights are sewn into the glove on the back of the hand as well on the back of each finger near the base of the fingernail. One would wear the gloves while performing everyday tasks and/or while practicing musical instruments that rely heavily on finger movements such as a piano, drums, a stringed instrument or any type of horn. Not only will the invention provide muscle strengthening, but when removed immediately before a performance, they will give the user the perception of lighter hands resulting in quicker hand movement and increased dexterity.

The use of the present invention allows users the ability to strengthen their hand and finger muscles in a quick, easy and effective manner so that increased dexterity and speed can be realized when playing a musical instrument.

An advantage of the present invention is that its use increases strength and dexterity of hand and finger muscles.

Other advantages of the present invention is that its use develops stamina, provides for better timing, and helps users to play faster.

Similarly, the present invention may also help typists or others engaged in dexterous repetitive motions.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the FIGS.

Figure 1:
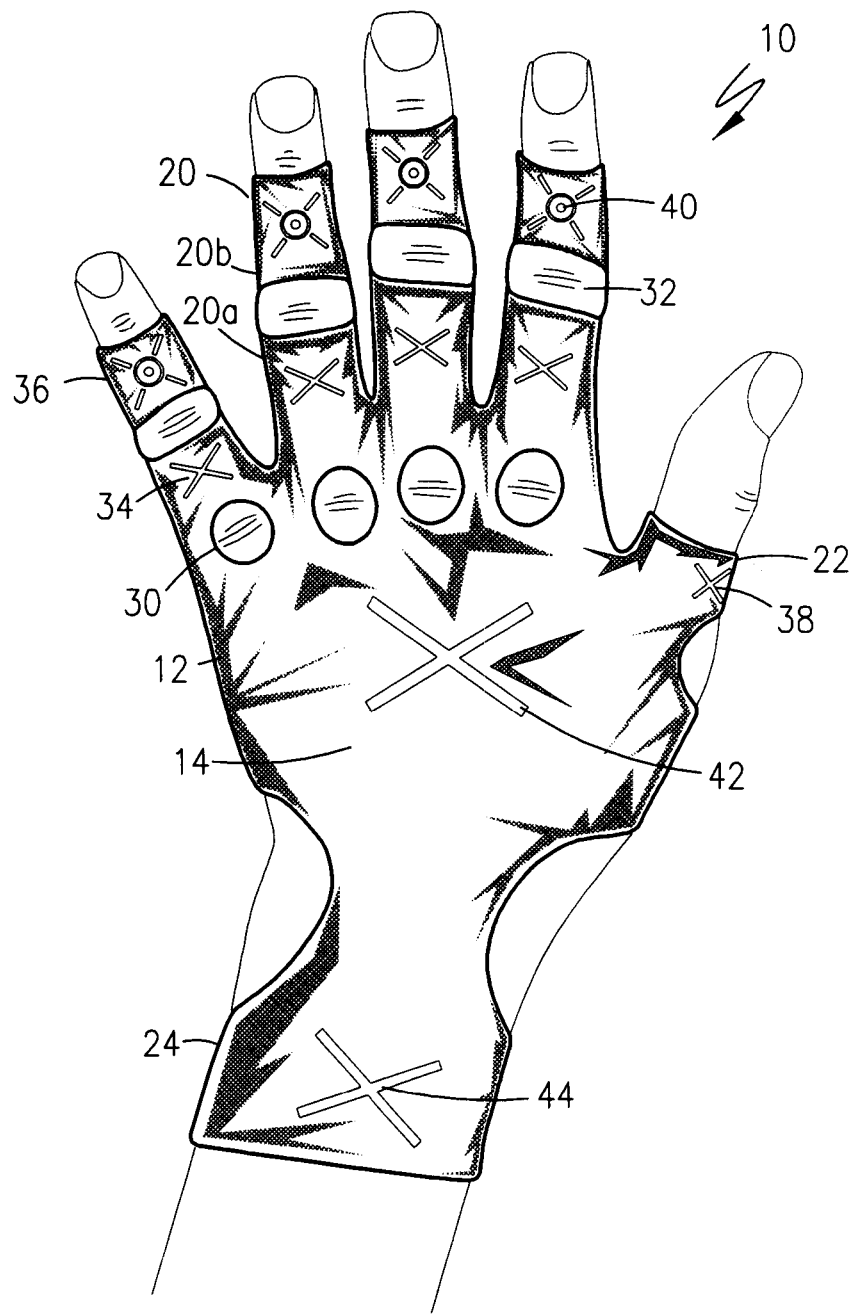
FIG. 1 is a top plan view of a musical instrument practice glove according to the preferred embodiment of the present invention.
Figure 2:
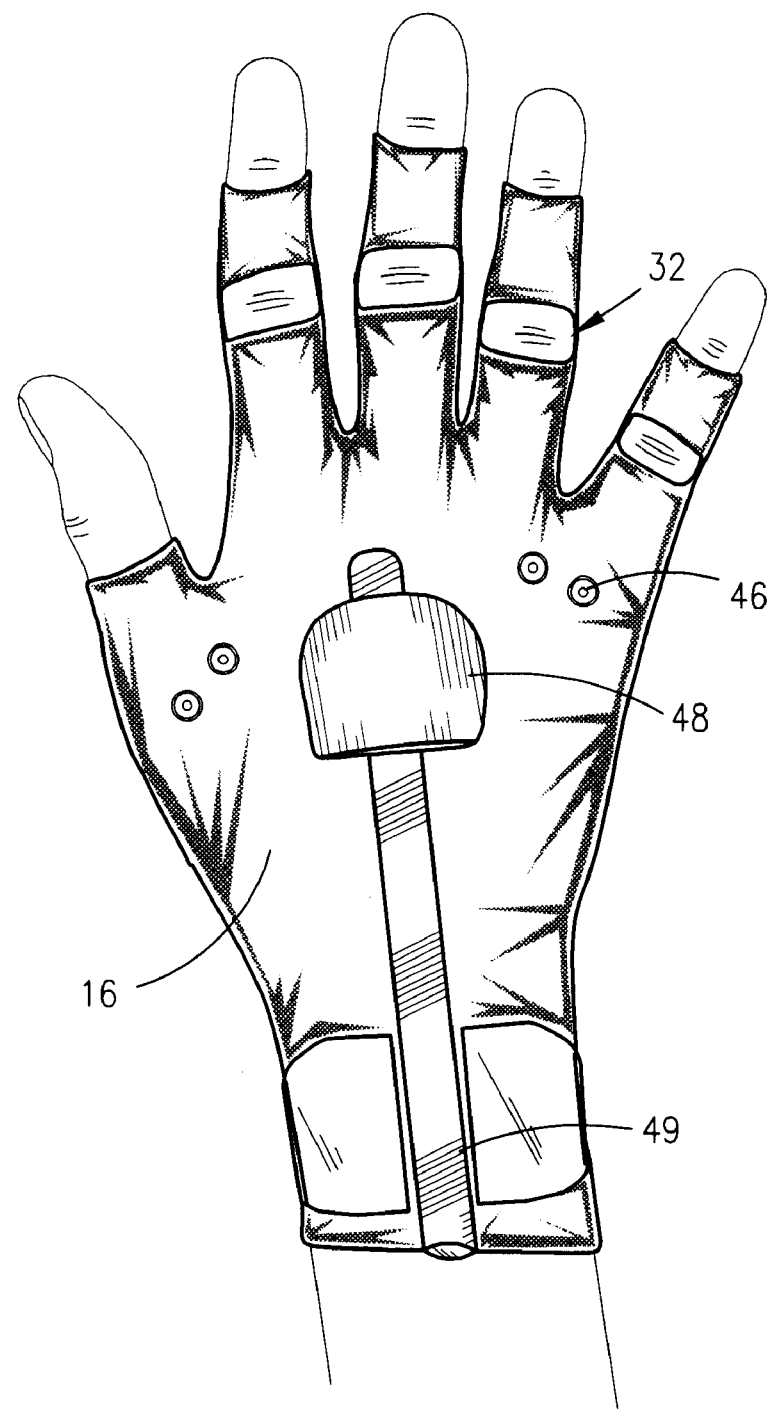
FIG. 2 is a bottom plan view thereof.

Referring now to FIGS. 1–2, a musical instrument practice glove 10 is shown, according to the present invention, for aiding a user in developing strength, speed, and stamina in the muscles of the hand utilized while playing a musical instrument. Accordingly, although an individual glove 10 is shown for use with the user's left hand, it is anticipated that a symmetric pair of such gloves 10 would be utilized herein. Each glove 10 has a hand mitt portion 12 formed of a backhand portion 14 (as shown in FIG. 1) and a palm portion 16 (as shown in FIG. 2). Extending from the distal end of each mitt 12 are four finger sleeves 20 and a thumb sleeve 22. Extending from the proximal end of each mitt 12 is a tubular wrist collar 24. A hand mitt hinge aperture 30 is formed within the backhand portion 14 at the connection point of each finger sleeve 20 and hand mitt 12, as well as at the connection point of each thumb sleeve 22 and hand mitt 12. It is anticipated that such a hand mitt hinge aperture 30 allows for free movement of the fingers without restriction of the knuckles of the hand.

Each finger sleeve 20 forms a first finger sleeve collar 20*a* and a linearly aligned second finger sleeve collar 20*b* extending linearly and laterally therefrom, and forming a finger sleeve hinge aperture 32 therebetween both on the backhand side as well as the palm side. A first digit weight 34 is housed and supported within each first finger sleeve collar 20*a*. A second digit weight 36 is housed and supported within each second finger sleeve collar 20*b*. It is anticipated that both the first digit weight 34 and second digit weight 36 are housed and supported on the backhand side of the glove 10. Further, an adjustment strap finger connection means 40 affixed to each second finger sleeve collar 20*b*, as will be described in greater detail below.

Further, and in a similar fashion, each thumb sleeve 22 has a thumb weight 38 is housed and supported therein. Within the backhand portion 14 of the hand mitt 12 is formed and supported a hand weight 42. And, within the wrist collar 24 is formed and supported a wrist weight 44.

Referring in greater detail to FIG. 2, the palm portion 16 supports a plurality of adjustment strap palm connection means 46, as will be described in greater detail below. Further, a palm posture urging means receiving pouch 48 and a wrist support receiving conduit 49 are formed within the palm portion 16.

Figure 3A:
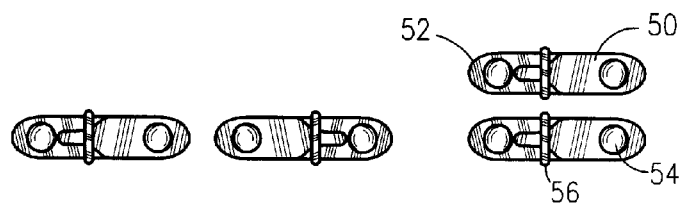
FIG. 3a is perspective view of a position adjustment strap for use therewith.

In conjunction with FIG. 3*a*–3*d*, various accessories are shown for use with a musical instrument practice glove 10 of the present invention. In detail, FIG. 3*a* depicts a position adjustment strap 50, of which a plurality are anticipated to be used. Each position adjustment strap 50 forms a linearly elongated strap body 52 having a connection means 54 at each end. Each connection means 54 is anticipated as being removably affixable to any adjustment strap finger connection means 40 or adjustment strap palm connection means 46 as was described above. Shown herein is a snap type connection means; however, any conventionally available connector, such as buttons, hook and loop fastener, or the like is anticipated as being of equivalent functionality and can perform a similar, if not identical functionality within the improvement of the present invention. Finally, a length adjustment means 56 is incorporated within the strap body 52 that allows a user to adjust and fix the linearly length of each position adjustment strap 50.

Figure 3B:
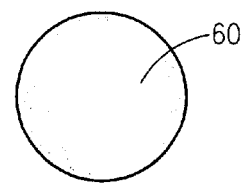
FIG. 3b is a perspective view of a palm position urging appliance for use therewith.

According to FIG. 3*b*, a palm posture urging appliance 60, shown as a lightweight but rigid spherical member such as a ping-pong ball, is provided for positioning within and retention by the palm posture urging means receiving pouch 48. By insertion of this appliance 60 within the pouch 48 a gently rolling structure can urge and support the user's wrist into the preferred hand and palm positioning as will be described in greater detail below.

Figure 3C:
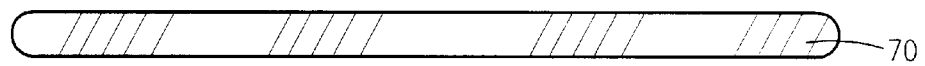
FIG. 3c is a side elevational view of a first wrist support position appliance for use therewith.
Figure 3D:
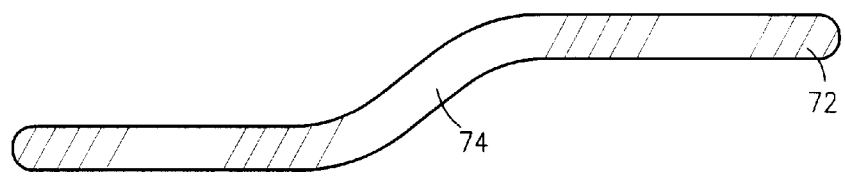
FIG. 3d is a side elevational view of a second wrist support position appliance for use therewith.

Finally, according to FIG. 3*c* and FIG. 3*d*, a first wrist support appliance 70 and second wrist support position appliance 72 are shown, respectively. Designed to be used alternatively, either wrist support appliance 70, 72 is placed within the wrist support receiving conduit 49 formed within the palm portion 16, and further urge and support the user's wrist into the preferred hand and palm positioning as will be described in greater detail below. As shown, the first wrist support appliance 70 is shown as a linearly elongated, rigid and straight element, while the second wrist support position appliance 72 is shown similar, but having a lateral offset 74 positioned therein.

2. Operation of the Preferred Embodiment

Figure 4A:
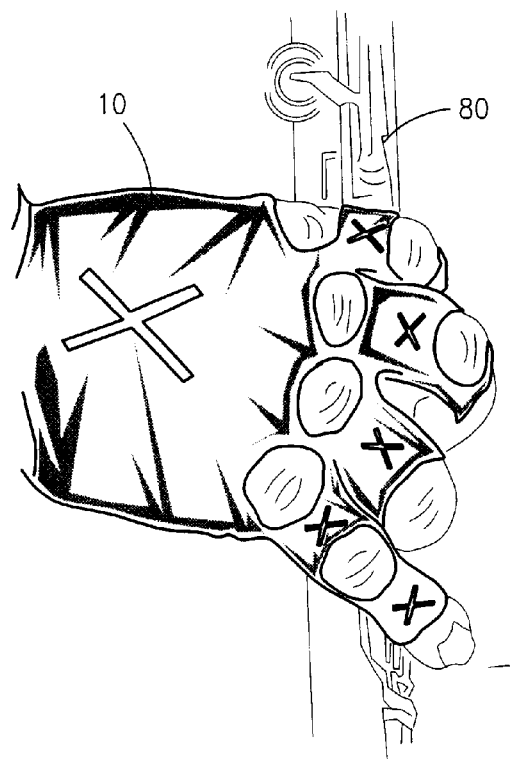
FIG. 4a is a side elevational view of a user wearing a musical instrument practice glove of the present invention while playing a musical instrument.
Figure 4B:
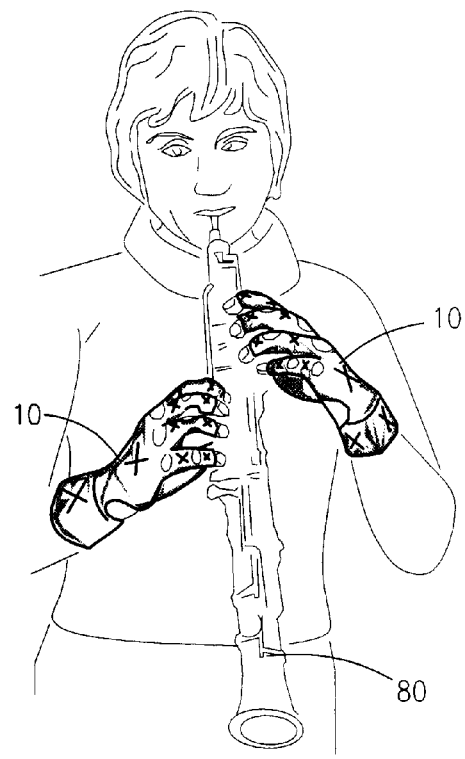
FIG. 4b is a front elevational view of a user wearing a musical instrument practice glove of the present invention while playing a musical instrument.

In accordance with a preferred embodiment of the present invention, as shown in FIG. 4*a* and 4*b*, the glove 10 is used while practicing any instrument. While shown herein as used in practicing a wind instrument 80, it is felt that the benefits of the present invention will inure to the user of any instrument, be it wind, percussion, string, or what not. By using the glove 10 with weights positioned on the wrist and fingers, the muscles of the shoulders, arms, hands, and fingers are conditioned. By positioning the appropriate wrist support positioning appliance 70, 72, or palm posture urging appliance 60, the proper hand, palm, and arm posture can be developed and reinforced. Placement of the position of the fingers, in lateral respect to one another, can be achieved by application of position adjustment straps 50 with various length adjustment means 56 positioned accordingly.

Continued use of the present invention, while practicing, will build the appropriate speed, strength, and stamina that will remain even without the use of the gloves during performances.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A musical instrument practice glove comprising:

a hand mitt portion formed of a backhand portion and a palm portion;

four finger sleeves extending from a distal end of said hand mitt portion;

a thumb sleeve extending from said distal end of said hand mitt portion;

a tubular wrist collar extending from a proximal end of said hand mitt portion;

digit weight means for providing increased weight to each said finger sleeve;

thumb weight means for providing increased weight to said thumb sleeve;

a hand mitt hinge aperture formed within said backhand portion at a connection point of each said finger sleeve and said hand mitt portion; and a hand mitt hinge aperture formed within said backhand portion at a connection point of said thumb sleeve and said hand mitt portion;

and wherein each finger sleeve forms a first finger sleeve collar and a linearly aligned second finger sleeve collar extending linearly and laterally therefrom, and forming a finger sleeve hinge aperture therebetween both on said backhand side as well as said palm side.

2. The musical instrument practice glove of claim 1, wherein said digit weight means comprises:

a first digit weight is housed and supported within a first finger sleeve collar; and a second digit weight housed and supported within a second finger sleeve collar;

wherein both said first digit weight and second digit weight are housed and supported on said backhand side of said glove.

3. The musical instrument practice glove of claim 1, wherein said thumb weight means comprises a thumb weight housed and supported within said thumb sleeve.

4. The musical instrument practice glove of claim 1, further comprising a hand weight formed and supported within said backhand portion.

5. The musical instrument practice glove of claim 1, further comprising a wrist weight formed and supported within said wrist collar.

6. A musical instrument practice glove comprising:

a hand mitt portion formed of a backhand portion and a palm portion;

four finger sleeves extending from a distal end of said hand mitt portion;

a thumb sleeve extending from said distal end of said hand mitt portion;

a tubular wrist collar extending from a proximal end of said hand mitt portion;

digit weight means for providing increased weight to each said finger sleeve; and thumb weight means for providing increased weight to said thumb sleeve; wherein said palm portion further supports a plurality of adjustment strap palm connection means.

7. A musical instrument practice glove comprising:

a hand mitt portion formed of a backhand portion and a palm portion;

four finger sleeves extending from a distal end of said hand mitt portion;

a thumb sleeve extending from said distal end of said hand mitt portion;

a tubular wrist collar extending from a proximal end of said hand mitt portion;

digit weight means for providing increased weight to each said finger sleeve; and thumb weight means for providing increased weight to said thumb sleeve;

a palm posture urging means receiving pouch; and a wrist support receiving conduit formed within the palm portion;

a palm posture urging appliance forming a rigid spherical member for receiving within said palm posture urging means receiving pouch; and a wrist support appliance for placement within said wrist support receiving conduit.

* * * * *